(12) United States Patent
Cruz Mota et al.

(10) Patent No.: US 9,563,854 B2
(45) Date of Patent: Feb. 7, 2017

(54) DISTRIBUTED MODEL TRAINING

(71) Applicant: Cisco Technology, Inc., San Jose, CA (US)

(72) Inventors: Javier Cruz Mota, Assens (CH); Jean-Philippe Vasseur, Saint Martin d'Uriage (FR); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 14/164,456

(22) Filed: Jan. 27, 2014

(65) Prior Publication Data
US 2015/0193695 A1 Jul. 9, 2015

Related U.S. Application Data

(60) Provisional application No. 61/923,847, filed on Jan. 6, 2014.

(51) Int. Cl.
*G06F 15/18* (2006.01)
*G06N 99/00* (2010.01)
(Continued)

(52) U.S. Cl.
CPC .......... *G06N 99/005* (2013.01); *G06F 21/577* (2013.01); *G06N 3/0454* (2013.01);
(Continued)

(58) Field of Classification Search
None
See application file for complete search history.

(56) References Cited

U.S. PATENT DOCUMENTS 7,526,806 B2 4/2009 Wiley et al.
7,603,709 B2 10/2009 Lewis et al.
(Continued)

FOREIGN PATENT DOCUMENTS

EP 2442525 A1 4/2012
WO WO-02/48959 A2 6/2002

OTHER PUBLICATIONS

Cai, et al., "Distributed Aggregation Algorithms with Load-Balancing for Scalable Grid Resource Monitoring", Parallel and Distributed Processing Symposium, Mar. 2007, 10 pages, Institute of Electical and Electronics Engineers.
(Continued)

*Primary Examiner* — Kakali Chaki
*Assistant Examiner* — Viker Lamardo
(74) *Attorney, Agent, or Firm* — Parker Ibrahim & Berg LLC; James M. Behmke; Stephen D. LeBarron

(57) ABSTRACT

In one embodiment, a device determines that a machine learning model is to be trained by a plurality of devices in a network. A set of training devices are identified from among the plurality of devices to train the model, with each of the training devices having a local set of training data. An instruction is then sent to each of the training devices that is configured to cause a training device to receive model parameters from a first training device in the set, use the parameters with at least a portion of the local set of training data to generate new model parameters, and forward the new model parameters to a second training device in the set. Model parameters from the training devices are also received that have been trained using a global set of training data that includes the local sets of training data on the training devices.

18 Claims, 9 Drawing Sheets

/ 400

1    Gradient Descent

Given a set of N data samples $Z = [\vec{z_1}, \ldots, \vec{z_n}] \in \mathbb{R}^{M \times N}$ and an objective function $F(\vec{w}, \vec{x})$, the Gradient Descent (GD) algorithm computes a minimum of this function by following the direction defined by the gradient with respect to $\vec{w}$, which is computed using the whole dataset Z:

1. Initialize $\vec{w}$ (e.g. to random values)
2. Initialize $\alpha$ (the step size)
3. while Stop criteria not reached do
4.    $\vec{g} = \vec{0}$
5.    for $i = 1, \ldots, N$ do
6.      $g = g + \nabla F(\vec{w}, \vec{z_i})$
7.    $\vec{w} = \vec{w} - \alpha * \vec{g}$
8. Return $\vec{w}$ 2    Stochastic Gradient Descent Given a set of N data samples $Z = [\vec{z_1}, \ldots, \vec{z_n}] \in \mathbb{R}^{M \times N}$ and an objective function $F(\vec{w}, \vec{x})$, the Stochoastic Gradient Descent (SGD) algorithm computes a minimum of this function by following the direction defined by the gradient with respect to $\vec{w}$, which is computed using a single sample from the dataset Z:

1. Initialize $\vec{w}$ (e.g. to random values)
2. Initialize $\alpha$ (the step size)
3. while Stop criteria not reached do
4.    Randomly shuffle the dataset Z
5.    for $i = 1, \ldots, N$ do
6.      $g = \nabla F(\vec{w}, \vec{z_i})$
7.    $\vec{w} = \vec{w} - \alpha * \vec{g}$
8. Return $\vec{w}$

(51) Int. Cl.
*G06N 3/08* (2006.01)
*G06N 3/04* (2006.01)
*G06F 21/57* (2013.01)
*H04L 29/06* (2006.01)

(52) U.S. Cl.
CPC .............. *G06N 3/08* (2013.01); *G06N 3/084* (2013.01); *H04L 63/1425* (2013.01); *H04L 63/1458* (2013.01)

(56) References Cited

U.S. PATENT DOCUMENTS

| | | |
|---|---|---|
| 7,657,940 B2 | 2/2010 | Portolani et al. |
| 7,675,926 B2 | 3/2010 | Olsen et al. |
| 7,694,335 B1 | 4/2010 | Turner et al. |
| 7,733,798 B2 | 6/2010 | White et al. |
| 7,779,471 B2 | 8/2010 | Balasubramaniyan et al. |
| 7,793,138 B2 | 9/2010 | Rastogi et al. |
| 7,854,000 B2 | 12/2010 | Venkat et al. |
| 7,971,256 B2 | 6/2011 | Bhikkaji et al. |
| 8,032,779 B2 | 10/2011 | Clemm et al. |
| 8,121,024 B1 | 2/2012 | Natarajan et al. |
| 8,161,554 B2 | 4/2012 | Sadhasivam et al. |
| 8,230,498 B2 | 7/2012 | Shaffer et al. |
| 8,261,355 B2 | 9/2012 | Rayes et al. |
| 8,312,541 B2 | 11/2012 | Levy-Abegnoli et al. |
| 8,619,576 B2 | 12/2013 | Vasseur et al. |
| 8,634,316 B2 | 1/2014 | Rosenberg et al. |
| 2003/0069867 A1* | 4/2003 | Coutts ............... G06F 17/30867 706/20 |
| 2008/0083029 A1 | 4/2008 | Yeh et al. |
| 2008/0148342 A1 | 6/2008 | Aiyagari et al. |
| 2010/0179692 A1* | 7/2010 | Lu ...................... H02P 23/0077 700/275 |
| 2011/0258702 A1 | 10/2011 | Olney et al. |
| 2012/0016816 A1* | 1/2012 | Yanase ................. G06N 99/005 706/10 |
| 2012/0023572 A1 | 1/2012 | Williams, Jr. et al. |
| 2012/0026938 A1 | 2/2012 | Pandey et al. |
| 2012/0155475 A1 | 6/2012 | Vasseur et al. |
| 2012/0230204 A1 | 9/2012 | Vasseur et al. |
| 2012/0320923 A1 | 12/2012 | Vasseur et al. |
| 2013/0010610 A1 | 1/2013 | Karthikeyan et al. |
| 2013/0024560 A1 | 1/2013 | Vasseur et al. |
| 2013/0159479 A1 | 6/2013 | Vasseur |
| 2013/0159548 A1 | 6/2013 | Vasseur et al. |
| 2013/0179538 A1 | 7/2013 | Dutta et al. |
| 2013/0219046 A1 | 8/2013 | Wetterwald et al. |
| 2013/0276114 A1 | 10/2013 | Friedrichs et al. |
| 2013/0298184 A1 | 11/2013 | Ermagan et al. |
| 2014/0022906 A1 | 1/2014 | Vasseur et al. |
| 2014/0025945 A1 | 1/2014 | McGrew et al. |
| 2014/0086495 A1* | 3/2014 | Hao ................... G06K 9/00664 382/218 |
| 2015/0061863 A1* | 3/2015 | Barfield, Jr. ....... G08B 21/0446 340/539.12 |
| 2015/0170053 A1* | 6/2015 | Miao .................... G06N 99/005 706/12 |

OTHER PUBLICATIONS

Hwang, et al., "DHT-Based Security Infrastructure for Trusted Internet and Grid Computing", International Journal of Critical Infrastructures, vol. 2, No. 4, Nov. 2009, pp. 412-433, Inderscience Publishers.

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, RAID, (2000), pp. 162-182, Springer-Verlag, London, UK.

Oh, et al., "Distributed Learning in Mobile Sensor Networks Using Cross Validation" 49th IEEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

Diego Peteiro-Barral et al.: "A survey of methods for distributed machine learning", Progress in Artificial Intelligence, vol. 2, No. 1, Nov. 15, 2012, pp. 1-11.

Aleksandar Lazarevic et al.: "Boosting Algorithms for Parallel and Distributed Learning", Distributed and Parallel Databases, Mar. 1, 2002, pp. 203-229.

Raghavendra V. Kulkarni et al.: "Neural network based secure media access control protocol for wireless sensor networks", International Joint Conference on Neural Networks, 2009, IEEE, Piscataway, NJ, USA, Jun. 14, 2009, pp. 1680-1687.

\* cited by examiner

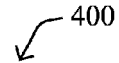

1 Gradient Descent

Given a set of $N$ data samples $Z = [\vec{z_1}, \ldots, \vec{z_N}] \in \mathbf{R}^{M \times N}$ and an objective function $F(\vec{w}, \vec{x})$, the Gradient Descent (GD) algorithm computes a minimum of this function by following the direction defined by the gradient with respect to $\vec{w}$, which is computed using the whole dataset $Z$:

1. Initialize $\vec{w}$ (e.g. to random values)
2. Initialize $\alpha$ (the step size)
3. while Stop criteria not reached do
4.     $\vec{g} = \vec{0}$
5.     for $i = 1, \ldots, N$ do
6.         $\vec{g} = \vec{g} + \nabla F(\vec{w}, \vec{z_i})$
7.     $\vec{w} = \vec{w} - \alpha * \vec{g}$
8. Return $\vec{w}$

2 Stochastic Gradient Descent

Given a set of $N$ data samples $Z = [\vec{z_1}, \ldots, \vec{z_N}] \in \mathbf{R}^{M \times N}$ and an objective function $F(\vec{w}, \vec{x})$, the Stochoastic Gradient Descent (SGD) algorithm computes a minimum of this function by following the direction defined by the gradient with respect to $\vec{w}$, which is computed using a single sample from the dataset $Z$:

1. Initialize $\vec{w}$ (e.g. to random values)
2. Initialize $\alpha$ (the step size)
3. while Stop criteria not reached do
4.     Randomly shuffle the dataset $Z$
5.     for $i = 1, \ldots, N$ do
6.         $\vec{g} = \nabla F(\vec{w}, \vec{z_i})$
7.         $\vec{w} = \vec{w} - \alpha * \vec{g}$
8. Return $\vec{w}$

FIG. 4

DISTRIBUTED MODEL TRAINING

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates example pseudocode for Gradient Descent algorithm and Stochastic Gradient Descent algorithms;

DESCRIPTION OF EXAMPLE EMBODIMENTS

Overview

Figure 1:
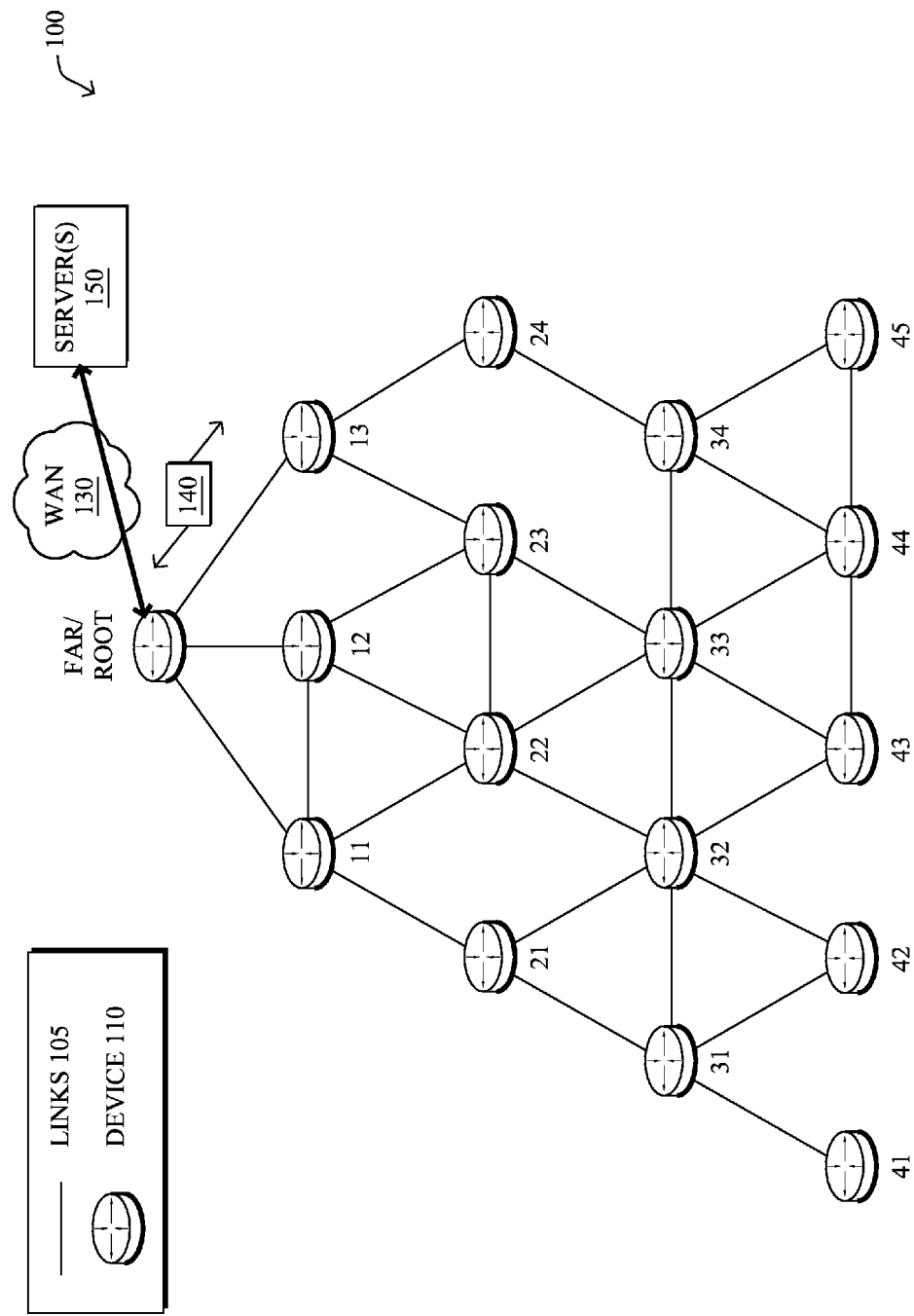
FIG. 1 illustrates an example communication network.

According to one or more embodiments of the disclosure, a device determines that a machine learning model is to be trained by a plurality of devices in a network. A set of training devices are identified from among the plurality of devices to train the model, with each of the training devices having a local set of training data. An instruction is then sent to each of the training devices that is configured to cause a training device to receive model parameters from a first training device in the set, use the parameters with at least a portion of the local set of training data to generate new model parameters, and forward the new model parameters to a second training device in the set. Model parameters from the training devices are also received that have been trained using a global set of training data that includes the local sets of training data on the training devices.

In some embodiments, a first training device receives model parameters for a machine learning model. The received model parameters are used to generate new model parameters by training the machine learning model with a local set of training data. The new model parameters are sent to a second training device configured to use the sent model parameters and a second set of training data on the second training device to train the machine learning model.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
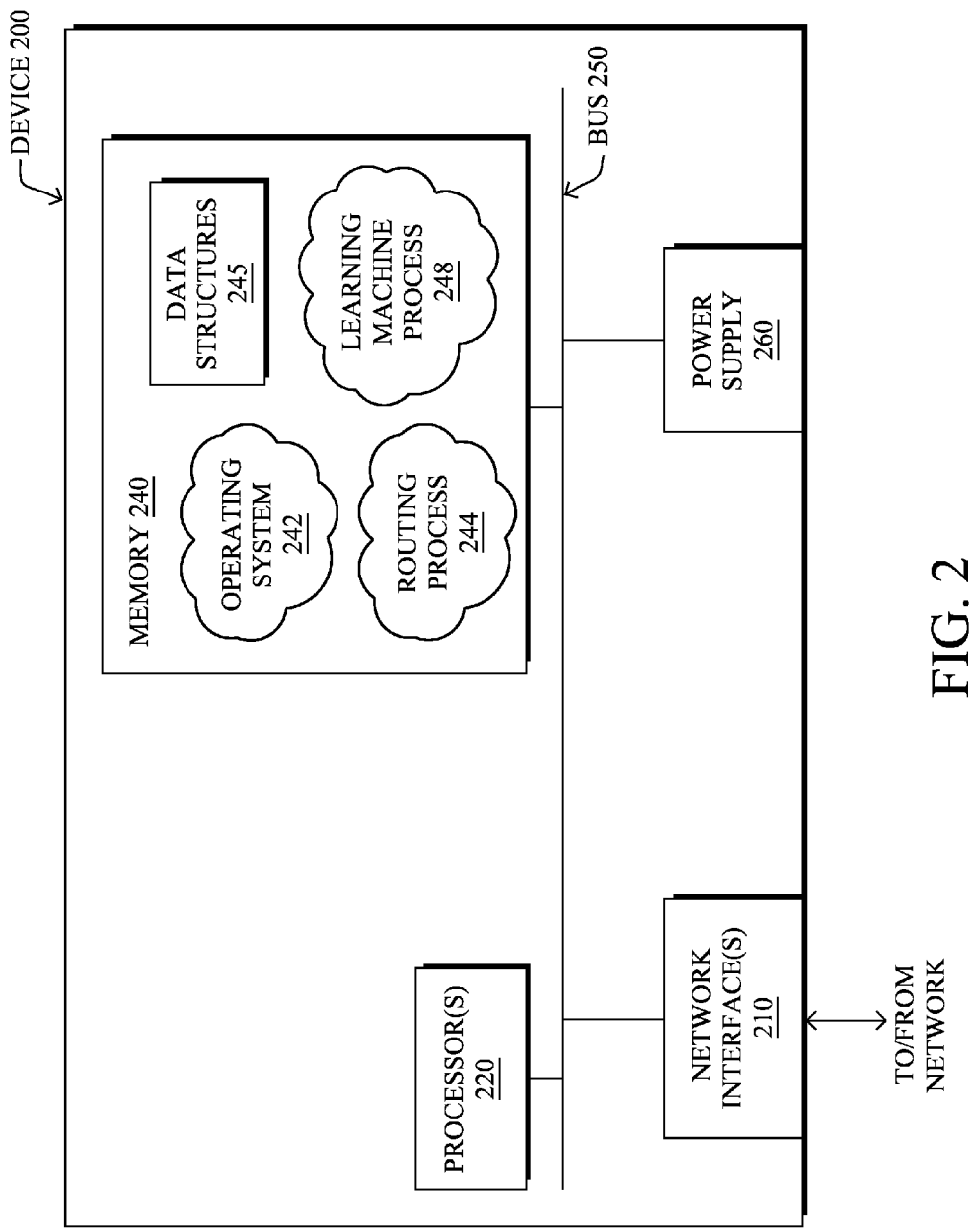
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads" or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
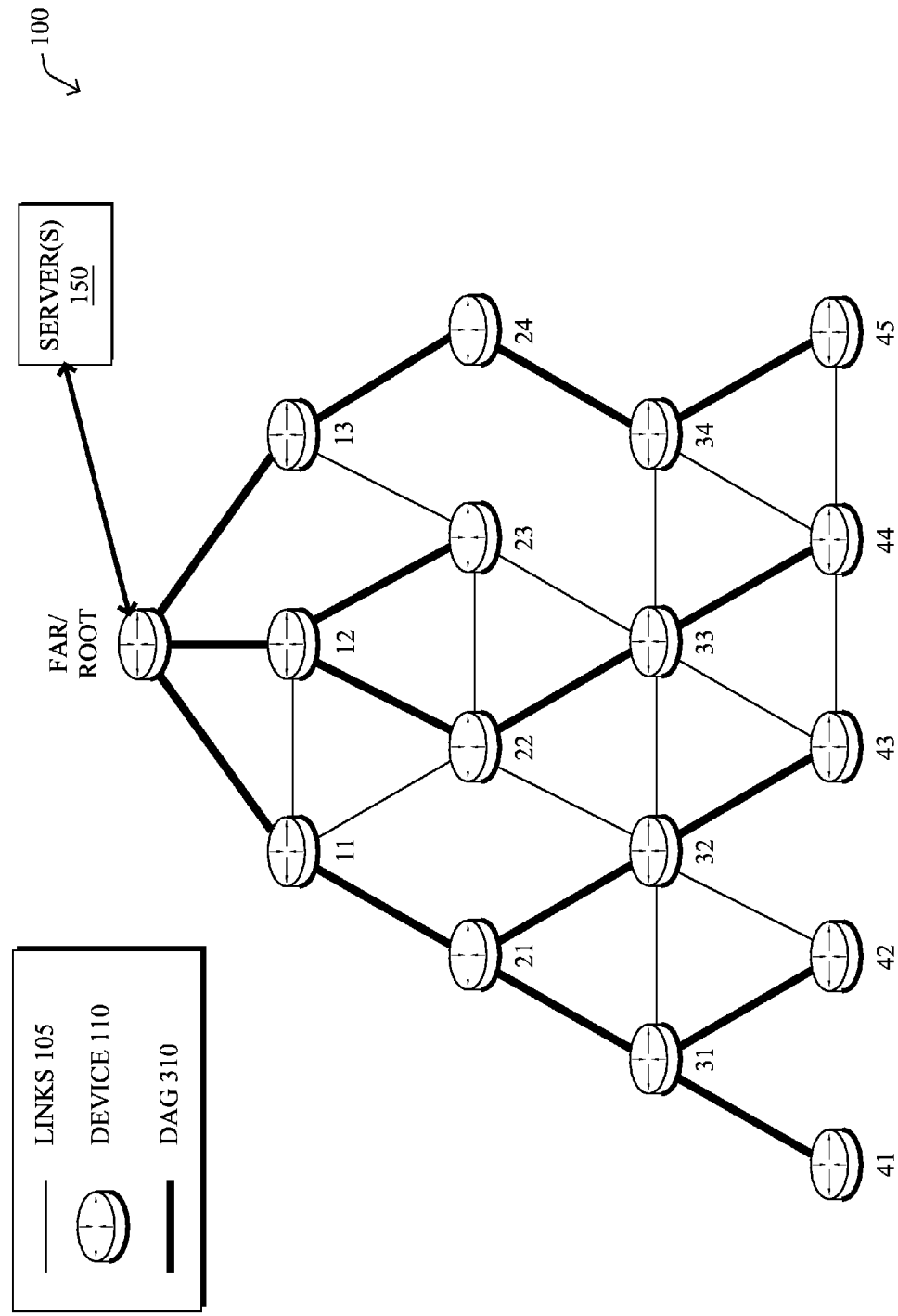
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

—Possible Attacks Against IoT—

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

—Frequency-Hopping and Synchronization in 802.15.4—

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID string

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

—802.15.4 Security—

Currently, IoT architecture comes with several embedded security mechanisms. The cornerstone of IoT security is indeed link layer encryption, which is mandatory for most frames (including routing messages and application traffic). Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

A Distributed Approach for Model Training

According to various embodiments, a machine learning model, such as an ANN, can be trained to detect network conditions, such as the presence of a DoS attack. Optimization of such a model may be performed in any number of ways. For example, the backpropagation algorithm performs an efficient computation of the gradient of the cost function for optimizing the weights in an ANN. Then, this gradient information can be used by an optimization algorithm, such as Gradient Descent for instance, for computing the optimum weights. However, applying backpropagation to large training datasets can be computationally intensive, since the contribution to the gradient of every single sample in the dataset has to be evaluated.

Example pseudocode to implement Gradient Descent and Stochastic Gradient Descent is shown in FIG. 4. The last may generally be used to reduce the impact of large amounts of training data on the computational costs associated with training. Indeed, the Stochastic Gradient Descent algorithm performs the optimization using a single sample of the training set at every step. This approach breaks the relationship between the size of the training set and the computational cost of every optimization step.

Gradient Descent and Stochastic Gradient Descent can be used, for instance, in conjunction with mechanisms for data collection, such as collecting a dataset in the context of attack detection, with the maximum of variability in its samples. However, if some particular phenomenon is not observed during the period of data collection, nothing can be done for collecting data related to it. For instance, weather phenomena such as rain typically impact wireless communications. But, if rain is not present during the data collection period in an outside network, features impacted by rain perturbations cannot be collected.

According to various embodiments, a voting mechanism may be used for choosing the best classifier from amongst a group of machine learning models (e.g., ANN classifiers, etc.) that are trained using different datasets collected on different networks. This approach solves the abovementioned issue with unobserved phenomena, if at least one of the training sets contains all the phenomena of interest. However, if none of the training sets are complete, the incompleteness problem will persist.

In further embodiments, it may be assumed that all phenomena have been observed from a global standpoint (i.e., after putting together all collected datasets) and centralized training may be performed. In one embodiment, all collected dataset may be sent to a central entity that merges the training sets and performs the training in the global dataset. However, this approach also requires high amounts of data traffic that would be exchanged over a low-speed, costly and non-reliable network, such as in the case of Field Area Routers (FARs) connected with 3G links.

According to the particular techniques described herein, a mechanism is defined for sharing the learning machine model (e.g., ANN, etc.) that is being trained, to perform a distributed training of the model that will globally consider all the training sets. In other words, the machine learning model will generally be trained using all phenomena observed in all datasets, thus allowing for the computation of a significantly more accurate model with maximum variability in the training set of the model. While the techniques herein are primarily described in the context of LLNs, it is to be appreciated that the techniques can also be applied to any other context where local training sets are not complete in terms of observed phenomena. Further, while the Stochastic Gradient Descent algorithm is generally described as the optimization technique used herein, the techniques can be easily adapted to employ other on-line optimization techniques, such as on-line Broyden-Fletcher-Goldfarb-Shanno (BFGS) techniques, for instance.

Said differently, the techniques disclosed herein introduce a mechanism for collectively training a machine learning model (e.g., an ANN or other model) between different Training Entities (e.g., Field Area Routers, Switches, etc.). This mechanism presents two main advantages with respect to simply performing centralized training. First, the techniques herein use different and independent datasets for the training, effectively using all this datasets without the necessity of transferring them (e.g., just the parameters of an ANN are transferred between training entities). This allows combining, in the same training process, different phenomena captured by different training sets. Second, the computational power required for training the model in the global dataset (i.e., the union of the individual datasets) is spread among the training entities participating in the collective training.

In contrast to simply implementing parallel versions of Stochastic Gradient Descent for optimization, the mechanisms herein provide an adapted version of Stochastic Gradient Descent for distributed training of a machine learning model from the point of view that each training entity has an incomplete dataset. In particular, the disclosed techniques allow for the training of a model to make the model as generalizable as possible thanks to the combination of different phenomena observed on different training sets, while still taking into account the overhead of the training entities (e.g., routers, switches, etc.) in terms of computational load and network load.

Specifically, according to various embodiments, a device determines that a machine learning model is to be trained by a plurality of devices in a network. A set of training devices are identified from among the plurality of devices to train the model, with each of the training devices having a local set of training data. An instruction is then sent to each of the training devices that is configured to cause a training device to receive model parameters from a first training device in the set, use the parameters with at least a portion of the local set of training data to generate new model parameters, and forward the new model parameters to a second training device in the set. Model parameters from the training devices are also received that have been trained using a global set of training data that includes the local sets of training data on the training devices.

Operationally, the embodiments defines a mechanism for performing a distributed training of a machine learning model, such as an ANN, to consider different training sets collected by different training entities (e.g., Field Area Routers in the case of LLNs or routers and switches in the general case). An objective of this approach is to take advantage of complimentary phenomena observed in different datasets, by training the model using the global dataset by coordinating the results obtained by a set of training entities. Note that this improves significantly the quality of the model and allows for potentially reducing the amount of traffic to be collected in each individual mesh.

The techniques herein generally involve two components. The first component performs a selection of the nodes that will collaborate for collectively training a machine learning model (e.g., an ANN, etc.) using independently collected datasets. The second component specifies the required interactions between training entities for globally performing a training of the model.

The following notations and elements are used herein:

A Training Entity (TE) may be a Field Area Router (FAR), Switch, or other device storing an available dataset capable of performing the training of a machine learning model, such as an ANN.

C denotes the list of TE candidates for performing the ANN training and |C| is the number of candidates in this list, i.e., C={$TE_1$, $TE_2$, . . . , $TE_{|C|}$}.

$LD_i$ denotes the local dataset available at Training Entity i, i.e., $TE_i$.

GD denotes the global dataset, which is the union of all $LD_i$, for i=1, . . . , |C|. Note that $LD_i$ may or may not overlap.

Figure 5A:
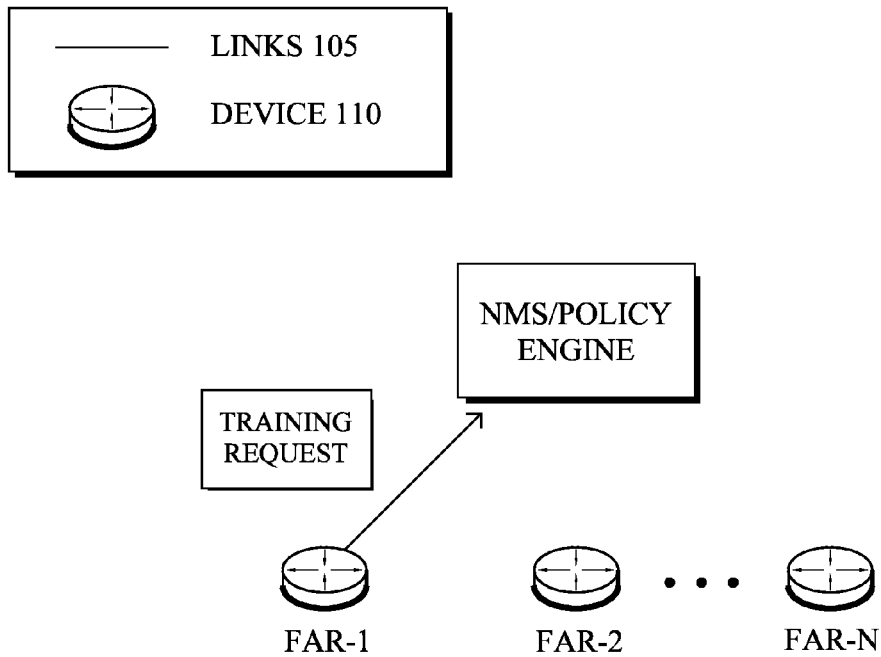
FIGS. 5A-5C illustrate an example of the selection of training devices with which to share a learning machine model.
Figure 5B:
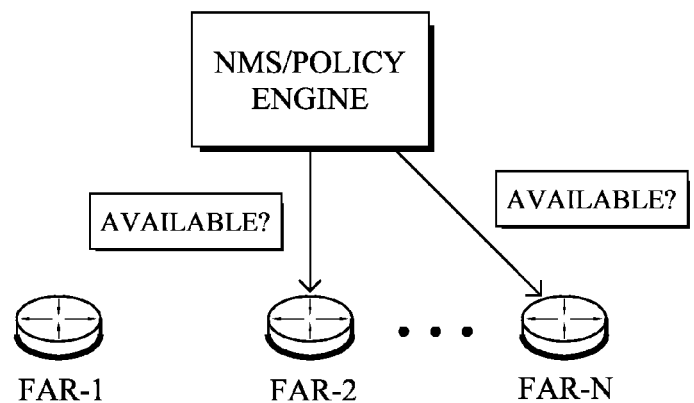
Figure 5C:
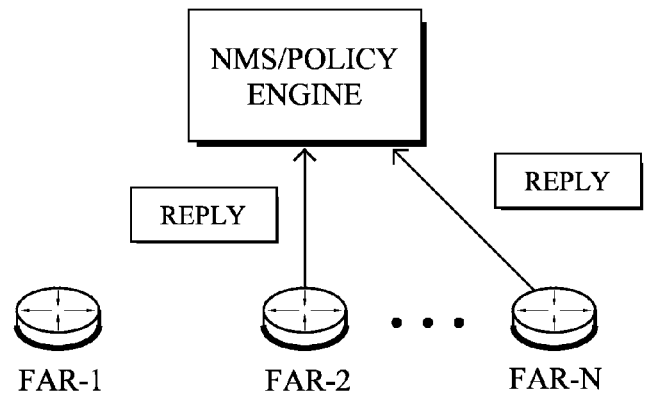

The first component performs the selection of the TEs that will participate in the collective training, as show in the examples of FIGS. 5A-5C. While described below primarily with respect to an ANN, TE selection may be performed in a similar manner using the model parameters of any number of different machine learning models. In one embodiment, the TE selection methodology is generally presented as follows:

Step 1: A TE interested in starting a collective training sends a newly specified training request message, Collec_Req( ) to the NMS, as depicted in FIG. 5A. For example, the TE may initiate collective training because the current ANN was trained a long time ago, because a decrease in the performance of the ANN has been detected, etc. For purposes of illustration, the term NMS is used generically (e.g., in one instance NMS can refer to a Network Management System or, alternatively, to a network controller in another instance). In one embodiment, the techniques herein specify a newly defined IPv6 unicast message from the TE to the NMS, containing any or all of the following type-length-values (TLVs):

1. Input features to the ANN or other model;
 2. Output features of the ANN or other model;
 3. Internal connections of the ANN or other model;
 4. Activation function of the neurons (e.g., log-sigmoid, tan-sigmoid, soft-max, etc.), or other internal model function;
 5. Description of the training set available in the TE (e.g., using histograms) and the number of samples; and
 6. Optionally, the current weights of the ANN can also be sent.

Step 2: Upon reception of a Collec_Req message, the NMS initializes a list of candidates C. At this step, this list may contain all the TEs that, based on the information available to the NMS, would be available for performing a collective training of a model. For example, the NMS may take into account the current computational and networking loads of potential TEs and the characteristics of the ANN to be trained. In one embodiment, the current "load" on a TE (e.g., in terms of memory, CPU, etc.) could be extracted using a routing protocol extension. For example, although link state routing protocols likely used between routers and switches may not support router metrics, extensions could be specified to that end. Alternatively, if the central entity in charge of the TE selection is a Path Computation Element (PCE) then more "load" information could be retrieved thanks to a protocol such as PCEP. In absence of real-time load information, the NMS may make use of static node attributes.

In one embodiment, as illustrated in the example of FIG. 5B, the NMS/Controller checks the availability of TEs in C by sending a newly specified Collec_Avail message, should the NMS require checking which nodes can act as TE (e.g., when the NMS/Controller does not know whether a node can act as a TE). The Collec_Avail message may either be a unicast IPv6 message or a multicast IPv6 message sent to a well-known multicast address (e.g., using the PIM protocol or other mechanism) associated to all the TEs in C or a subset of C. The Collec_Avail message may contain any or all of the following TLVs:

1. Input features to the ANN or other model;
 2. Output features of the ANN or other model;
 3. Activation function of the neurons (e.g., log-sigmoid, tan-sigmoid, soft-max, etc.) or other function used in the model; and
 4. (Optionally, when available) An expected duration of the training.

Step-3: Each TE, upon reception of a Collec_Avail message, checks whether the dataset locally available contains the required features (input and output) for training the ANN or other model. In turn, the potential TEs respond either positively or negatively to the NMS, as illustrated in the example of FIG. 5C. If the check is positive and the current computational and traffic load allows the TE to participate in a collective training of the ANN during the required period, the TE accepts the request from the NMS/Controller by sending to the NMS a Collec_Acc message, which is a newly defined unicast IPv6 message. This message may contain the following TLV:

1. Description of the training set available in the TE and the number of samples. In one embodiment, the replying TE does not provide the actual dataset but a compressed summary of the dataset (e.g., using histograms, etc.).

On the contrary, if the check is negative due to incompatibilities between the local dataset and the required features for the training, or because the current network or computational load does not allow for performing the training, the TE may reject the request by sending a newly defined unicast IPv6 Collec_Rej message to the controller/NMS, in one embodiment.

Step 4: After collecting all the Collec_Acc or Collec_Rej messages, the controller computes the list of TE in C available for the collective training. Optionally, the NMS can check if there are datasets that are equivalent, thanks to the dataset descriptions reported by each TE that has accepted the request (e.g., as part of the Collec_Acc messages). Then, TEs with superfluous datasets can also be removed by the NMS from the list C. Such pre-preprocessing would allow for not including in C TEs that would add little value during training. The final list of candidates (denoted C' herein) contains the list of TEs that will participate in the collective training of the ANN or other model. Note that if at the end of the process the list C' is empty, no collective training can be performed. This may be reported to the TE that requested the collective training by sending to it a Colleq_Neg message, which is also a newly defined IPv6 unicast message.

In another embodiment, the procedure to select TEs may be triggered by the controller/NMS, without reception of a Collec_Req message. For example, the NMS may initiate model training because a low traffic period is expected and the computational resources of the network nodes can be assigned to ANN training for a certain period of time.

In both embodiments, and in the context of ANN classifiers for attack detection in particular, if the final list of candidates C' is empty (e.g., because of incompatibilities in the datasets on the TEs), a mechanism can be used for collecting new datasets in the TEs. For example, nodes can be identified that have to be attacked in order to collect a dataset with as much variability as possible. Also, a mechanism for turning a node into a jammer for attacking another node may be used, to simulate such an attack and generate the dataset.

The second component coordinates the optimization, once the list of participants C' in the collective training has been computed. This coordination may be performed following the next steps:

Step 1: The controller/NMS may first determine the random sequence of iterations for covering the whole GD.

In one embodiment, the controller generates just a random sequence of TEs by shuffling the list C' and then each TE will apply Stochastic Gradient Descent or other optimization mechanism to its whole LD before sending the results to the next TE in the sequence. The controller/NMS may also take into account other parameters when computing the sequence of TE in C'. For example, the NMS may advantageously take into account the routing topology shared among the TEs, in order to find the shortest path traversing all TEs in C'. Optionally the NMS may take into account the activity of each TE. For example, a particular TE may perform a computationally intensive operation between a time T1 and a time T2. In such a case, the sequence should be generated to avoid involving the particular TE during that specific time period.

In one embodiment, the NMS sends a Collect_Who message, which is a newly defined IPv6 unicast message, to each TE in C' with any or all of the following TLVs:

1. Incoming TE (i.e., the TE from which the model to be trained will be received);

2. Outgoing TE (i.e. the TE to which the model has to be sent after local training); and 3. Optionally, the random sequence to cover all the samples in the LD can be specified. If this TLV is not sent, the TE will generate locally the random sequence to traverse the samples in the LD.

The first TE in the list has the controller as incoming TE and the last in the list has the controller as outgoing TE.

In another embodiment, a random sequence for every single sample in the whole GD is generated in the controller. Then, the controller communicates this sequence to every TE in C' by sending a Collect_Sin message, which is a novel IPv6 unicast message that contains any or all of the following TLVs:

1. A sequence of incoming TEs;
2. A sequence of outgoing TEs; and
3. TS, which is the sequence for traversing the LD.

Note that the three sequences have the same number of elements.

The Collect_Sin message may be sent as a multicast messages to all nodes in C', in which case, the sequences in the TLVs have to contain the information for each TE.

Then, after receiving the ANN or other model parameters from the first incoming TE, the sample indicated by the first element of the received Training Sequence (TS) in Collect_Sin, is used for optimization and the resulting ANN is sent to the first outgoing TE. After performing this step, the first element of each sequence is removed.

As before, the first TE has the NMS as first incoming TE and the last has the NMS as outgoing TE.

Since the sequence TS may potentially grow very large, a distributed hash table mechanism can be used. In such an embodiment, the sequence TS is substituted by a TE-address to samples interval map. Each TE would then use a random number generator for traversing the dataset. For example $TE_i$ would generate a random number, use the map in order to infer that such sample belongs to $TE_D$'s dataset and send the Collect_Sin to $TE_D$. The message will also specify a total number of training samples to be used, which will be used as stop criterion.

In the first embodiment described above, the NMS/controller decides the sequence of TEs. Then, each TE performs an optimization using its whole LD before sending the results to the next TE. In the second embodiment described above, the controller decides the whole sequence of samples amongst the GD. Then, each TE performs an optimization using a single sample in its LD (i.e., the sample indicated by the sequence provided by the controller) before sending the results to the next TE (i.e., the TE to which the next sample in the sequence belongs to, which can potentially be the current TE).

A third embodiment, in between the first and second embodiments above, can be considered. In particular, instead of treating the whole LDs (i.e., the first embodiment above) or just a single sample (i.e., the second embodiment above) at each step, LDs can be divided into subsets. This reduces the number of Collect_Step messages (see Step 2 below) with respect to the second embodiment, while keeping a higher randomness in the use of the samples in the GD with respect to the first embodiment.

This mode of operation is communicated to the TEs by a Collect_Sub message, which is a newly defined IPv6 unicast message containing any or all of the following TLVs:

1. A sequence of incoming TEs;
2. A sequence of outgoing TEs;
3. TS, which is a sequence for traversing the subsets in LD; and 4. A method for generating the subsets that will be traversed following the order indicated in TS. This can include, for example, by just indicating the size of the subsets. Each TE then generates its subsets of this size, or in precisely indicating the samples that should be included in each subset, for giving some examples.

Figure 6A:
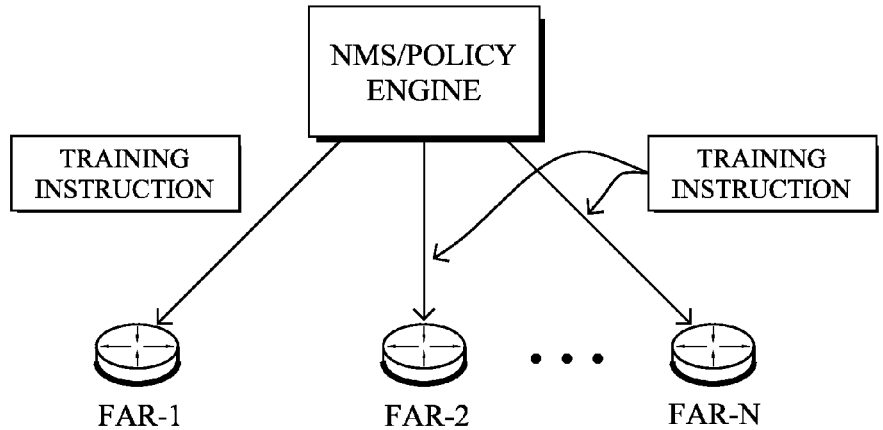
FIGS. 6A-6D illustrate an example of a learning machine model being shared among a plurality of training devices.

Thus, as shown generally in the example of FIG. 6A, the NMS sends training instructions to each of the TEs selected to perform the collective training. Such training instructions may include information regarding the overall sequence of TEs to train the model and may further specify which datasets or portions of datasets are used for the is training.

Step 2: After communicating all the sequence information to each TE, the controller/NMS sends a Collect_Step message, which is a newly defined IPv6 unicast message, to the first TE. This message may contain any or all of the following TLVs:

1. The weights of the ANN;
2. The activation functions of the neurons;
3. Input features of the ANN; and
4. Output features of the ANN.

Figure 6B:
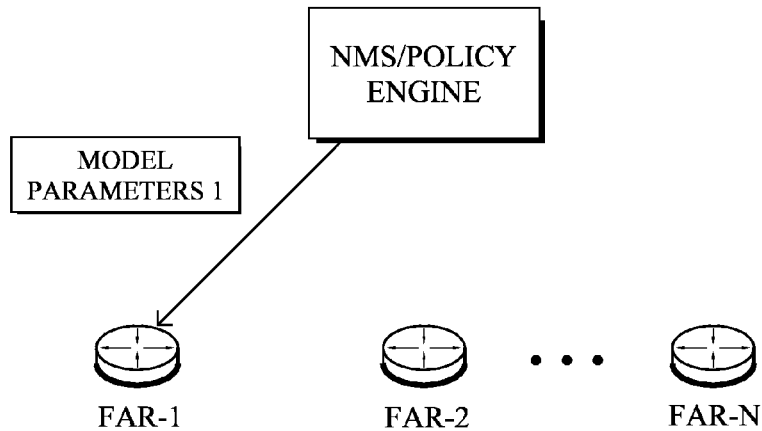
Figure 6C:
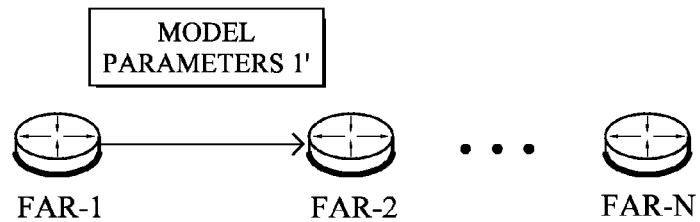

For example, as shown in FIG. 6B, the NMS may send the above model parameters to the first TE selected to perform the collective training. Then, the TE performs the optimization step according to the specified mode of operation: whole dataset (Collect_Who), single sample (Collect_Sin), or subset (Collect_Sub), as described above. After obtaining the new ANN, the result is sent to the next TE using a Collect_Step message. For example, as shown in FIG. 6C, FAR-1 may send the new ANN parameters to FAR-2 after FAR-1 trains the model using at least a portion of its own local dataset.

Figure 6D:
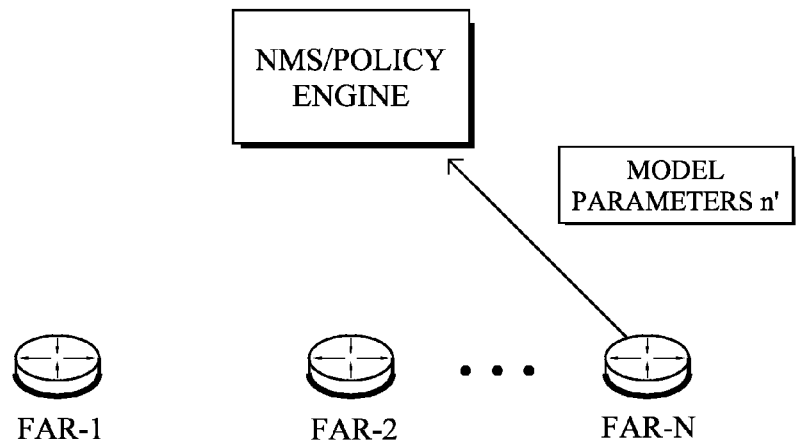

Step 3: Once all TEs have performed their corresponding optimization steps, the controller/NMS receives back the ANN via a Collect_Step message. For example, as shown in FIG. 6D, FAR-N may send the final, trained model parameters back to the NMS. At this point the ANN optimization process has considered all of the samples in GD at least once. In one embodiment, the NMS can decide to stop the process if, for instance, some performance requirements have been achieved or the current conditions of the network does not allow the optimization. Note that for assessing the performance of the ANN, a method for cross-validating an ANN classifier can also be used. In another embodiment, the NMS can also decide to continue the optimization and training, in which case processing returns to step 1 above for choosing the new sequence for the optimization.

Figure 7:
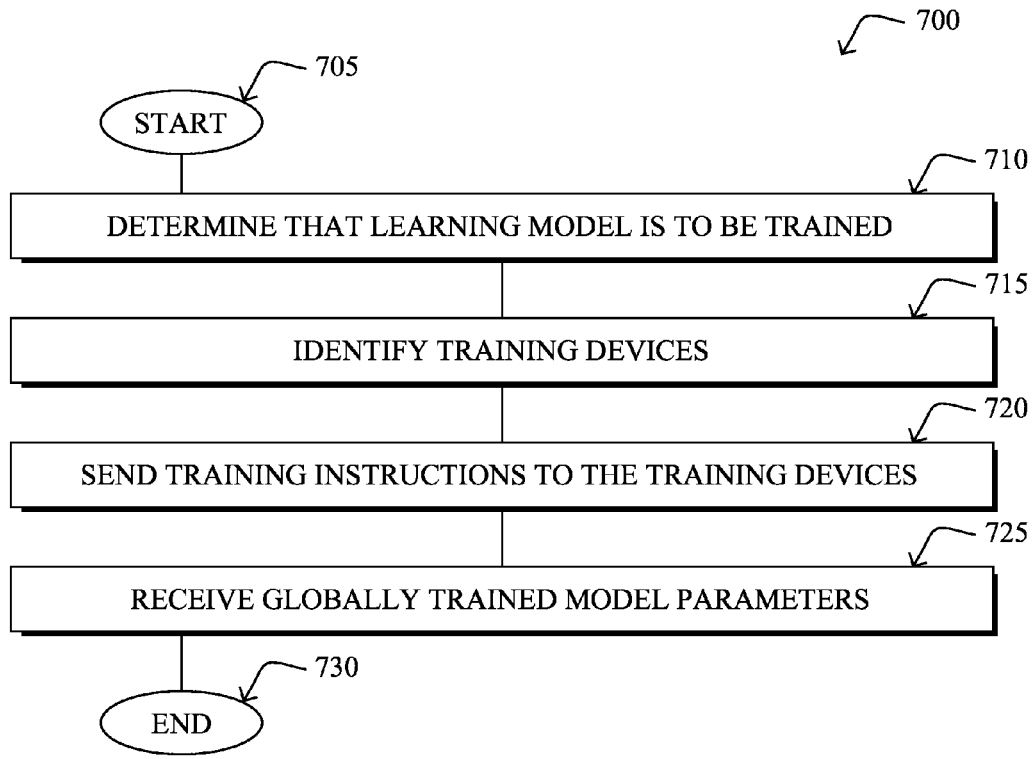
FIG. 7 illustrates an example simplified procedure for globally training a machine learning model.

FIG. 7 illustrates a simplified procedure for globally training a machine learning model, such as an ANN (e.g., from the perspective of an NMS). Procedure 700 starts at step 705 and continues on to step 710 where, as described in greater detail above, it is determined that a learning model is to be trained. For example, an NMS may proactively determine that a model is to be trained (e.g., at times of low network activity) or reactively (e.g., in response to a training request from one of the network nodes/devices). In step 715, a set of one or more training devices is identified. As highlighted in greater detail above, for example, the devices may be identified based on the available resources of the devices, a match between the model to be trained and the local datasets of the devices, etc. In step 720, training instructions are then sent to the training devices. For example, as detailed above, the training instructions may include data regarding what portion of a local data set is to be used to train the model, an ordering for how the training devices train the model, and/or other such information. In step 725, globally trained model parameters (i.e., trained using the local data sets of the training devices) are then received and the procedure ends at step 730.

Figure 8:
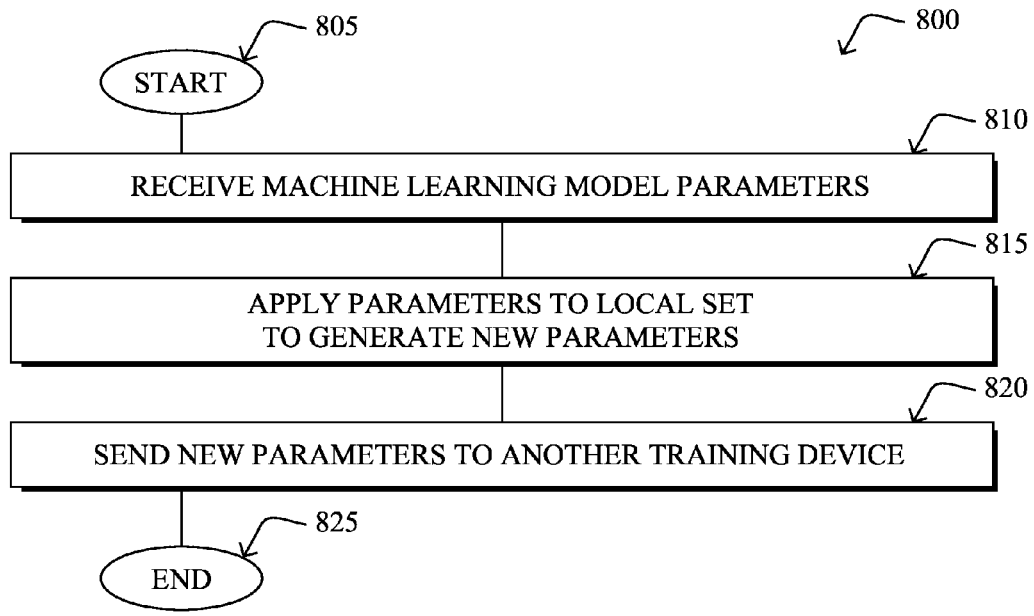
FIG. 8 illustrates an example simplified procedure for training a machine learning model using a local data set.

FIG. 8 illustrates a simplified procedure for training a machine learning model using a local data set. Procedure 800 starts at step 805 and continues on to step 810 where, as highlighted above, machine learning model parameters are received by a device. For example, a network device may receive ANN weights, activation functions, etc. of the model to be trained. In step 815, the received model parameters are applied to a local set of data to generate new model parameters. In other words, the received model is trained in step 815 using the device's local dataset. In step 820, the newly generated model parameters are then sent to another training device and procedure 800 ends at step 825.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for a distributed approach for training a machine learning model, such as an ANN. In particular, the techniques herein allow the training of a model, such as an ANN, using different datasets located in different training entities, without the necessity of transferring the data (e.g., the ANN parameters are transferred). This assures that all the phenomena captured by all the individual training sets are considered in the training process, without the necessity of centralizing the training process or the training sets.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   determining, by a device, that a machine learning model is to be trained by a plurality of devices in a network;
   identifying, by the device, a set of training devices from among the plurality of devices in the network to train the machine learning model over a sequence of the set, wherein each of the training devices has a local set of training data;
   determining, by the device, the sequence of the training devices, wherein the sequence is random or based on estimated routing times between the training devices;
   instructing, by the device, the training devices in the set to sequentially train the machine learning model using the local data sets on the training devices, wherein a training device of the training devices receives model parameters from a first training device in the set, uses the received model parameters with at least a portion of the local set of training data to generate new model parameters, and forwards the new model parameters to a second training device in the sequence; and
   receiving, by the device, model parameters from the training devices that have been trained using a global set of training data comprising the local sets of training data on the training devices.

2. The method as in claim 1, wherein the machine learning model is an artificial neural network (ANN).

3. The method as in claim 1, further comprising:
   receiving a request to train the machine learning model, wherein the request comprises model parameters;
   using the model parameters in the request to identify the set of training devices.

4. The method as in claim 3, further comprising:
   sending the model parameters in the request to the plurality of devices in the network, wherein a device in the plurality determines whether a local data set on the device is compatible with the model parameters in the request; and
   receiving, from the devices in the plurality, indications as to whether or not the model parameters are compatible with the local data sets on the plurality of devices, wherein the identified set of training devices comprises devise having compatible local data sets.

5. The method as in claim 1, further comprising:
   identifying a time period of low network activity; and
   initiating the training of the machine learning model during the identified time period.

6. The method as in claim 1, further comprising:
   dividing the global set of training data into samples of the local sets of training data, wherein the samples correspond to a subset of the local sets of training data on the training devices;
   determining a sequence of the samples to be processed by the training device; and
   instructing the training devices to sequentially train the machine learning model using the samples.

7. The method as in claim 1, further comprising:
   dividing each local set of training data into a plurality of subsets;
   selecting subsets of training data from the plurality to be used to train the machine learning model;
   determining a sequence of the selected subsets; and
   instructing the training devices to sequentially train the machine learning model using the selected subsets of training data.

8. The method as in claim 1, further comprising:
   sending a collection message to the training devices to request the model parameters that have been trained using the global set of training data.

9. An apparatus, comprising:
   one or more network interfaces to communicate in a computer network;
   a processor coupled to the network interfaces and configured to execute one or more processes; and
   a memory configured to store a process executable by the processor, the process when executed operable to:
   determine that a machine learning model is to be trained by a plurality of devices in a network;
   identify a set of training devices from among the plurality of devices in the network to train the machine learning model over a sequence of the set, wherein each of the training devices has a local set of training data;
   determining the sequence of the training devices, wherein the sequence is random or based on estimated routing times between the training devices;
   instructing the training devices in the set to sequentially train the machine learning model using the local data sets on the training devices, wherein a training device of the training devices receives model parameters from a first training device in the set, uses the received model parameters with at least a portion of the local set of training data to generate new model parameters, and forwards the new model parameters to a second training device in the sequence; and
   receive model parameters from the training devices that have been trained using a global set of training data comprising the local sets of training data on the training devices.

10. The apparatus as in claim 9, wherein the machine learning model is an artificial neural network (ANN).

11. The apparatus as in claim 9, wherein the process when executed is further operable to:
    divide the global set of training data into samples of the local sets of training data, wherein the samples correspond to a subset of the local sets of training data on the training devices;
    determine a sequence of the samples to be processed by the training device; and
    instruct the training devices to sequentially train the machine learning model using the samples.

12. The apparatus as in claim 9, wherein the process when executed is further operable to:

divide each local set of training data into a plurality of subsets;
select subsets of training data from the plurality to be used to train the machine learning model;
determine a sequence of the selected subsets; and
instruct the training devices to sequentially train the machine learning model using the selected subsets of training data.

13. A method comprising:
receiving, from a first training device, model parameters for a machine learning model;
using the received model parameters to generate new model parameters by training the machine learning model with a local set of training data; and
sending the new model parameters to a second training device configured to use the sent model parameters and a second set of training data on the second training device to distribute training of the machine learning model across a sequence of training devices, wherein the sequence is random or based on estimated routing times between the training devices.

14. The method as in claim 13, further comprising:
receiving a request to train the machine learning model;
determining whether the local set of training data is compatible with the machine learning model; and
sending a reply that indicates whether or not the local set of training data is compatible with the machine learning model.

15. The method as in claim 13, further comprising:
receiving an instruction to train the machine learning model, wherein the instruction identifies which portion of the local set of training data is to be used to generate the new model parameters.

16. An apparatus, comprising:
one or more network interfaces to communicate in a computer network;
a processor coupled to the network interfaces and adapted to execute one or more processes; and
a memory configured to store a process executable by the processor, the process when executed operable to:
receive, from a first training device, model parameters for a machine learning model;
use the received model parameters to generate new model parameters by training the machine learning model with a local set of training data; and
send the new model parameters to a second training device configured to use the sent model parameters and a second set of training data on the second training device to distribute training of the machine learning model across a sequence of training devices, wherein the sequence is random or based on estimated routing times between the training devices.

17. The apparatus as in claim 16, wherein the machine learning model is an artificial neural network (ANN).

18. A tangible, non-transitory, computer-readable media having software encoded thereon, the software when executed by a processor operable to:
determine that a machine learning model is to be trained by a plurality of devices in a network;
identify a set of training devices from among the plurality of devices in the network to train the machine learning model over a sequence of the set, wherein each of the training devices has a local set of training data;
determining the sequence of the training devices, wherein the sequence is random or based on estimated routing times between the training devices;
instructing the training devices in the set to sequentially train the machine learning model using the local data sets on the training devices, wherein a training device of the training devices receives model parameters from a first training device in the set, uses the received model parameters with at least a portion of the local set of training data to generate new model parameters, and forwards the new model parameters to a second training device in the sequence; and
receive model parameters from the training devices that have been trained using a global set of training data comprising the local sets of training data on the training devices.

* * * * *

UNITED STATES PATENT AND TRADEMARK OFFICE
CERTIFICATE OF CORRECTION

PATENT NO. : 9,563,854 B2
APPLICATION NO. : 14/164456
DATED : February 7, 2017
INVENTOR(S) : Javier Cruz Mota et al.

It is certified that error appears in the above-identified patent and that said Letters Patent is hereby corrected as shown below:

In the Specification

Column 13, Line 61, please amend as shown:
lec_Req(), to the NMS, as depicted in FIG. 5A. For example, Column 16, Line 37, please amend as shown:
to infer that such sample belongs to $TE_j$'s dataset and send Column 16, Line 38, please amend as shown:
the Collect_Sin to $TE_j$. The message will also specify a total Column 17, Line 12, please amend as shown:
datasets or portions of datasets are used for the training.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*